US012791180B1

(12) United States Patent
Li

(10) Patent No.: US 12,791,180 B1
(45) Date of Patent: Nov. 10, 2026

(54) HEAT-DISSPATING HEADLAMP

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 19/340,008

(22) Filed: Sep. 25, 2025

(30) Foreign Application Priority Data

Jul. 30, 2025 (CN) ......................... 202511058250.5

(51) Int. Cl.
*F21V 29/70* (2015.01)
*F21V 21/084* (2006.01)
*F21V 21/30* (2006.01)
*F21V 23/04* (2006.01)
*F21V 31/00* (2006.01)

(52) U.S. Cl.
CPC ............ *F21V 29/70* (2015.01); *F21V 21/084* (2013.01); *F21V 21/30* (2013.01); *F21V 23/0414* (2013.01); *F21V 31/005* (2013.01)

(58) Field of Classification Search
CPC ........ F21V 29/70; F21V 21/084; F21V 21/30; F21V 23/0414
See application file for complete search history.

(56) References Cited

U.S. PATENT DOCUMENTS 9,746,170 B1 8/2017 Armer et al.
10,208,903 B2 2/2019 Eivaz
10,551,012 B2 2/2020 Schorr, III
12,104,772 B1 * 10/2024 Heegaard .................. A61L 2/20
2008/0316736 A1 * 12/2008 Hunnewell ............... F21L 4/04 362/187
2012/0057331 A1 * 3/2012 Janice ....................... F21L 4/02 362/374
2014/0146552 A1 * 5/2014 Hui .......................... B62J 6/015 362/549

(Continued)

FOREIGN PATENT DOCUMENTS

CN 2846992 Y 12/2006
CN 201438724 U 4/2010

(Continued)

OTHER PUBLICATIONS

Extended Search Report issued on Feb. 26, 2026, in corresponding European Application No. 25203524.1, 10 pages.

*Primary Examiner* — Leah Macchiarolo
(74) *Attorney, Agent, or Firm* — Maier & Maier, PLLC

(57) ABSTRACT

A heat-dissipating headlamp, including a housing with a heat dissipation channel, a light source module and a power supply module both located within the housing. The light source module includes a circuit board electrically connected to the power supply module. The circuit board and the power supply module are respectively positioned on two sides of the heat dissipation channel, with one side of the circuit board close to the heat dissipation channel being fully or partially exposed. The heat dissipation channel exists between the power supply module and the circuit board. Heat generated by the light source module is rapidly conducted to the circuit board. The circuit board is exposed within the heat dissipation channel, allowing external air to flow into the channel, exchange heat with the circuit board, and then exit, thereby achieving efficient heat dissipation for the light source module and consequently improving lighting performance.

9 Claims, 7 Drawing Sheets

(56) References Cited

U.S. PATENT DOCUMENTS

| | | | | |
|---|---|---|---|---|
| 2014/0198484 | A1* | 7/2014 | Feustel | F21L 4/00 362/105 |
| 2015/0192286 | A1* | 7/2015 | Hansen | F21L 4/027 362/373 |
| 2017/0241634 | A1 | 8/2017 | Almaraz | |
| 2021/0215326 | A1 | 7/2021 | Besley et al. | |
| 2021/0348734 | A1* | 11/2021 | Bertken | F21L 4/02 |
| 2023/0277273 | A1 | 9/2023 | Christianson et al. | |
| 2024/0050187 | A1* | 2/2024 | Learn | A41D 1/002 |
| 2025/0035298 | A1 | 1/2025 | Cao et al. | |

FOREIGN PATENT DOCUMENTS

| | | | |
|---|---|---|---|
| FR | 2989447 | A1 | 10/2013 |
| KR | 102054168 | B1 | 12/2019 |

* cited by examiner

HEAT-DISSPATING HEADLAMP

CROSS-REFERENCE TO RELATED APPLICATION(S)

The present application claims priority to Chinese Patent Application No. 202511058250.5, filed on Jul. 30, 2025, the content of all of which is incorporated herein by reference.

FIELD

The present application relates to technical field of headlamps, in particular to a heat-dissipating headlamp.

BACKGROUND

Lighting device is required in environments with insufficient light. A headlamp is a portable lighting device typically worn on a user's head. Since the headlamp does not require handheld operation, and offering high convenience.

In the prior art, headlamps generate considerable heat during operation, leading to an increase in temperature. To reduce the operating temperature of headlamps, conventional headlamps commonly employ additional heat dissipation components or utilize metal lamp housings for dissipating heat. However, such heat dissipation methods also have the problems of increasing the cost and weight of the headlamp. Furthermore, inadequate heat dissipation results in diminished lighting performance.

Therefore, the prior art still requires improvement and development.

SUMMARY

The present application aims to solve the technical problems of the prior art by providing a heat-dissipating headlamp, with an objective of resolving the issue of excessive temperature in conventional headlamps adversely affecting lighting performance.

The technical solution adopted by the present application to solve the technical problem is as follows:

In a first aspect, the present application provides a heat-dissipating headlamp, including:

- a housing, where a heat dissipation channel is formed; and
- a light source module and a power supply module, both located within the housing, where the light source module includes a circuit board;
- the circuit board and the power supply module are electrically connected;
- the circuit board and the power supply module are respectively positioned on two sides of the heat dissipation channel, and one side of the circuit board close to the heat dissipation channel is partially or entirely exposed within the heat dissipation channel.

In the present technical solution, heat generated by the light source module is rapidly transferred to the circuit board, and the circuit board is exposed in the heat dissipation channel. External air can flow into the heat dissipation channel, exchange heat with the circuit board, and then exit the heat dissipation channel, thereby achieving rapid heat dissipation for the light source module.

In other technical solutions of the present application, the heat-dissipating headlamp further includes:

- a sealing structure, located between the circuit board and an inner wall of the housing.

In the present technical solution, the sealing structure prevents external moisture or water (such as mist) from the heat dissipation channel from entering the one side of the circuit board opposite to the heat dissipation channel.

In other technical solutions of the present application, the one side of the circuit board close to the heat dissipation channel is covered with a thermally conductive insulating layer; or

- the one side of the circuit board close to the heat dissipation channel is laminated with a metal layer and an insulating layer.

In the present technical solution, the thermally conductive insulating layer provides both thermal conduction and electrical insulation. Heat from the circuit board is transferred to the thermally conductive insulating layer without risk of electrical leakage. The insulating layer blocks electrical current conduction, while the metal layer facilitates rapid heat transfer, thereby achieving simultaneous thermal conduction and electrical insulation.

In other technical solutions of the present application, the light source module includes:

- a light source, disposed on an other side of the circuit board opposite to the heat dissipation channel.

In the present technical solution, heat generated by the light source is conducted and uniformly distributed through the circuit board, and dissipated through the heat dissipation channel.

In other technical solutions of the present application, the light source module further includes:

- an optical component, located in a light emission direction of the light source.

In the present technical solution, the optical component outputs light emitted by the light source.

In other technical solutions of the present application, a first connector is disposed on the circuit board, and a second connector is disposed on the power supply module; the first connector and the second connector are connected.

In the present technical solution, an electrical connection between the power supply module and the light source module is established through an interconnection of the first connector and the second connector.

In other technical solutions of the present application, a limiting plate is formed inside the housing, and the limiting plate surrounds the light source.

In the present technical solution, the light source is protected by the limiting plate.

In other technical solutions of the present application, a button is disposed on an upper surface of the housing, and the button is electrically connected to the light source module; and/or

- the heat dissipation channel penetrates through the upper surface and a lower surface of the housing.

In the present technical solution, the light source module is controlled through the button, while rapid airflow through the heat dissipation channel enables rapid heat dissipation for the light source module.

In other technical solutions of the present application, the heat-dissipating headlamp further includes:

- a connecting member, rotatably connected to the housing;
- the connecting member is configured in a curved-surface shape adapted to a forehead.

In the present technical solution, wearing of the heat-dissipating headlamp is achieved through the connecting member.

In other technical solutions of the present application, an arc-shaped member is disposed on the housing, an elastic protrusion is disposed on the connecting member, and the elastic protrusion abuts against the arc-shaped member;

a mounting base is disposed on the housing, and a shaft hole is formed in the mounting base;

a rotating shaft is disposed on the connecting member, and the rotating shaft is inserted into the shaft hole;

a central axis of the arc-shaped member is coaxial with a central axis of the rotating shaft;

connection portions are respectively disposed on a left end and a right end of the connecting member, and the connection portions are configured to connect a headband.

In the present technical solution, an included angle between the connecting member and the housing is adjusted and fixed by the elastic protrusion pressing against the arc-shaped member, thereby adjusting an illumination direction of the light source module. A rotational connection between the housing and the connecting member is achieved. The connecting member is secured to user's head through the headband.

Beneficial Effects: The heat dissipation channel exists between the power supply module and the circuit board. Heat generated by the light source module is rapidly transferred to the circuit board, and the circuit board is exposed within the heat dissipation channel. External air flows into the heat dissipation channel, exchanges heat with the circuit board, and then exits the channel, thereby achieving rapid heat dissipation for the light source module and consequently improving lighting performance.

DETAILED DESCRIPTION OF EMBODIMENTS

To make the objectives, technical solutions, and advantages of the present application clearer and more explicit, the following further elaborates the present application in detail with reference to the accompanying drawings and embodiments. It should be understood that the specific embodiments described herein are merely intended to explain the present application and not to limit it.

Refer to FIG. 1 to FIG. 12, the present application provides some embodiments of a heat-dissipating headlamp. The headlamp is usually worn on a forehead of a user's head. During lighting, the headlamp generates a large amount of heat. When heat accumulates and temperature of the headlamp rises, an output power of the headlamp may decrease, resulting in poor lighting performance. Additionally, using the headlamp in high-temperature environments may further increase the temperature of the headlamp and reduce lighting performance. Moreover, excessive temperature of the headlamp also poses safety risks. Therefore, it is necessary to reduce the temperature of the headlamp. In the prior art, heat dissipation is achieved by structures such as fans and heat dissipation fins. The present application uses a heat dissipation channel for heat dissipation, eliminating a need for additional structures such as fans or heat dissipation fins. This ensures effective heat dissipation while reducing size and cost of the headlamp.

Figure 1:
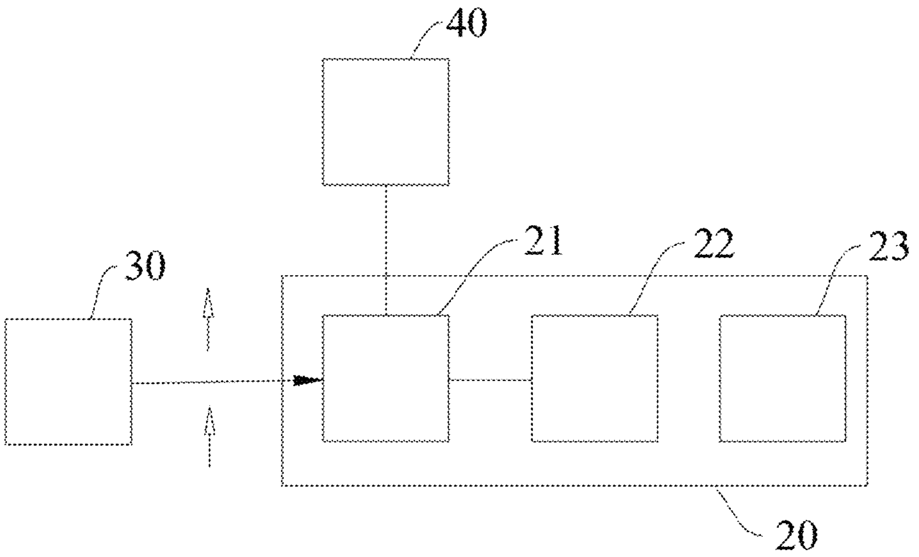
FIG. 1 is a functional block diagram of a heat-dissipating headlamp according to an embodiment of the present application.

As shown in FIG. 1, the heat-dissipating headlamp of the present application includes a light source module 20. The light source module 20 emits light for lighting. The light source module 20 includes a circuit board 21. The circuit board 21 functions to conduct heat, conducting heat generated by the light source module 20 for dissipation. One side of the circuit board 21 close to a heat dissipation channel 11 is covered with a thermally conductive insulating layer. The thermally conductive insulating layer is made of a thermally conductive insulating material and possesses both thermal conductivity and insulation properties, for example, using thermally conductive insulating ceramics. In another embodiment, the side of the circuit board 21 close to the heat dissipation channel 11 is laminated with a metal layer and an insulating layer. The metal layer may be an aluminum layer, an iron layer, a copper layer, etc. The metal layer has thermal conductivity. The insulating layer is located between the metal layer and the circuit board 21, and the insulating layer has insulation properties. The light source module 20 further includes a light source 22. The light source 22 converts electrical energy into light energy, thereby emitting light. The light source 22 is disposed on an other side of the circuit board 21 opposite to the heat dissipation channel 11. Thus, heat generated by the light source 22 is quickly conducted to the circuit board 21 and then transferred to the circuit board 21, utilizing a relatively large surface area of the circuit board 21 for rapid heat dissipation, thereby improving lighting performance. The light source 22 may employ LEDs.

As shown in FIG. 1, the heat-dissipating headlamp of the present application includes a power supply module 30. The power supply module 30 provides electrical energy. The power supply module 30 and the light source module 20 are electrically connected, and the power supply module 30 supplies electrical energy to the light source module 20 (solid arrows in FIG. 1 indicate a direction of electrical energy transmission). The power supply module 30 may use a rechargeable power source, such as a lithium battery. The heat dissipation channel 11 is provided between the power supply module 30 and the circuit board 21 (hollow arrows in FIG. 1 indicate a direction of air flowing within the heat dissipation channel 11, the heat dissipation channel 11 is referred to FIG. 4). The side of the circuit board 21 close to the heat dissipation channel 11 is entirely or partially exposed within the heat dissipation channel 11. The exposed area of the circuit board 21 accounts for more than 80% of a total area of the side surface of the circuit board 21 facing the heat dissipation channel 11. With the circuit board 21 largely exposed within the heat dissipation channel 11, external air can flow into the heat dissipation channel 11, exchange heat with the circuit board 21, and then exit the heat dissipation channel 11, achieving rapid heat dissipation for the light source module 20. The heat dissipation channel 11 fully covers a side surface of the power supply module 30 facing the heat dissipation channel 11, and the side surface of the power supply module 30 facing the heat dissipation channel 11 is also fully exposed within the heat dissipation channel 11.

As shown in FIG. 1, the heat-dissipating headlamp of the present application includes a button 40. The button 40 is connected to the circuit board 21. The button 40 may be a power button for turning the headlamp on and off. The button 40 may also be an adjustment function button for adjusting power or modes of the headlamp. The circuit board 21 is controlled by the button 40, thereby controlling the headlamp.

Figure 2:
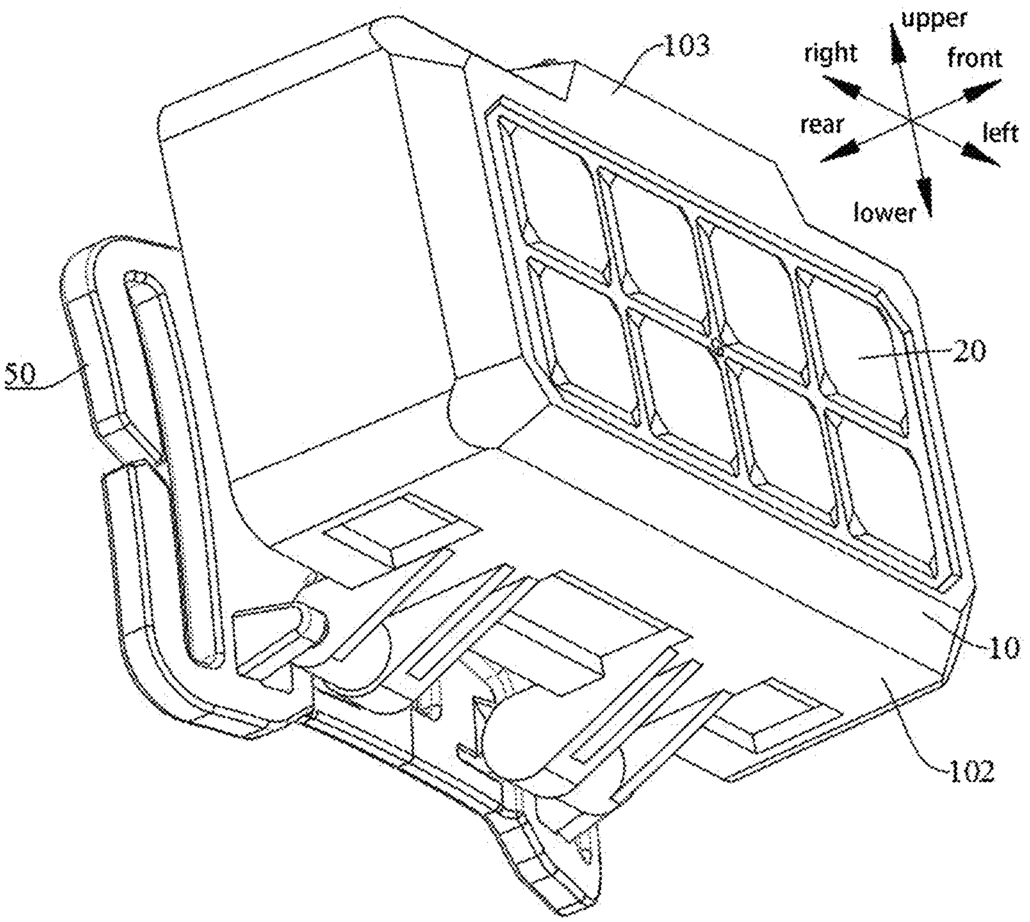
FIG. 2 is a first perspective view of the heat-dissipating headlamp according to an embodiment of the present application.

As shown in FIG. 2, the heat-dissipating headlamp of the present application includes a housing 10. The housing 10 has a cuboid shape with six surfaces, an upper surface 101, a lower surface 102, a front side surface 103, a rear side surface 104, a left side surface, and a right side surface (refer to FIG. 4). With a light emission direction of the light source module 20 defined as a forward direction, the light source module 20 emits light from the front side surface 103 of the housing 10. The housing 10 does not obstruct the side surface of the circuit board 21 facing the heat dissipation channel 11 or the side surface of the power supply module 30 facing the heat dissipation channel 11, allowing the side surface of the circuit board 21 facing the heat dissipation channel 11 and the side surface of the power supply module 30 facing the heat dissipation channel 11 to fully contact the air in the heat dissipation channel 11, thereby increasing a contact area. The increased contact area in turn increases a heat dissipation area and improves the heat dissipation efficiency.

As shown in FIG. 2, the heat-dissipating headlamp of the present application includes a connecting member 50. The connecting member 50 is positioned on the rear side surface 104 of the housing 10. The connecting member 50 can be worn on user's head through a headband, thus fixing the connecting member 50 to user's forehead. The connecting member 50 is rotatably connected to the housing 10. The housing 10 can rotate relative to the connecting member 50, allowing adjustment of an orientation of the housing 10 and consequently changing the light emission direction of the light source module 20.

Figure 3:
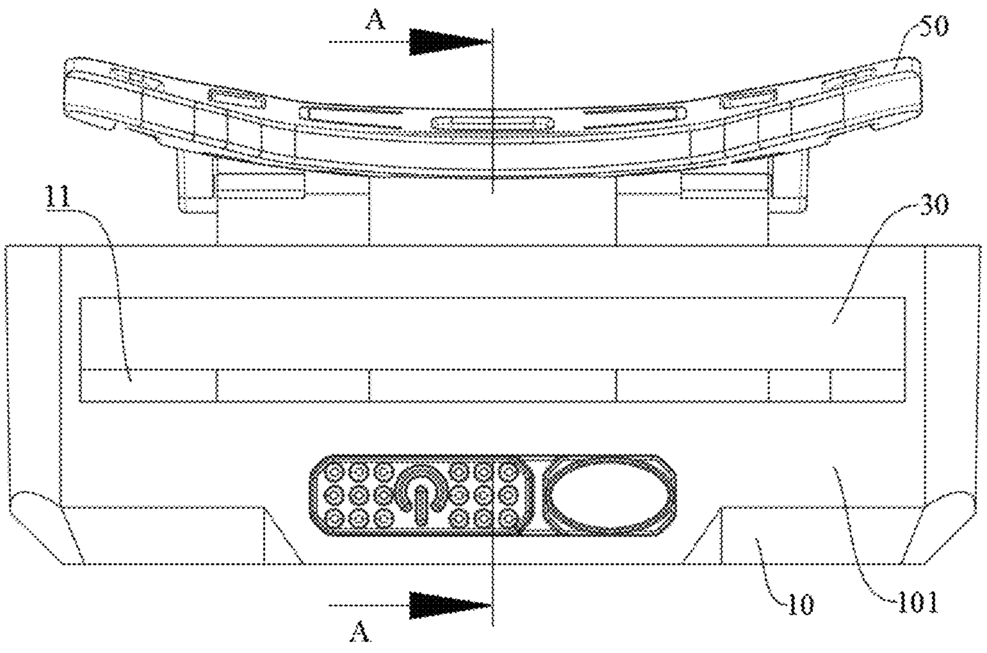
FIG. 3 is a top view of the heat-dissipating headlamp according to an embodiment of the present application.

As shown in FIG. 3, the housing 10 forms the heat dissipation channel 11. The heat dissipation channel 11 penetrates through the housing 10. The heat dissipation channel 11 disposed in a penetrating manner allows air to pass through rapidly, thereby achieving rapid heat dissipation. A gap is formed between the connecting member 50 and the housing 10. On one hand, the gap facilitates heat dissipation of the power supply module 30; on the other hand, the gap helps reduce heat transfer from the headlamp to user's forehead. The connecting member 50 has a curved-surface shape (refer to FIG. 5). The curved surface of the connecting member 50 matches the curved surface of user's forehead. As the connecting member 50 contacts the forehead, the connecting member 50 does not create excessive pressure, avoids damaging the forehead, and facilitates secure attachment of the connecting member 50 to the forehead.

Figure 4:
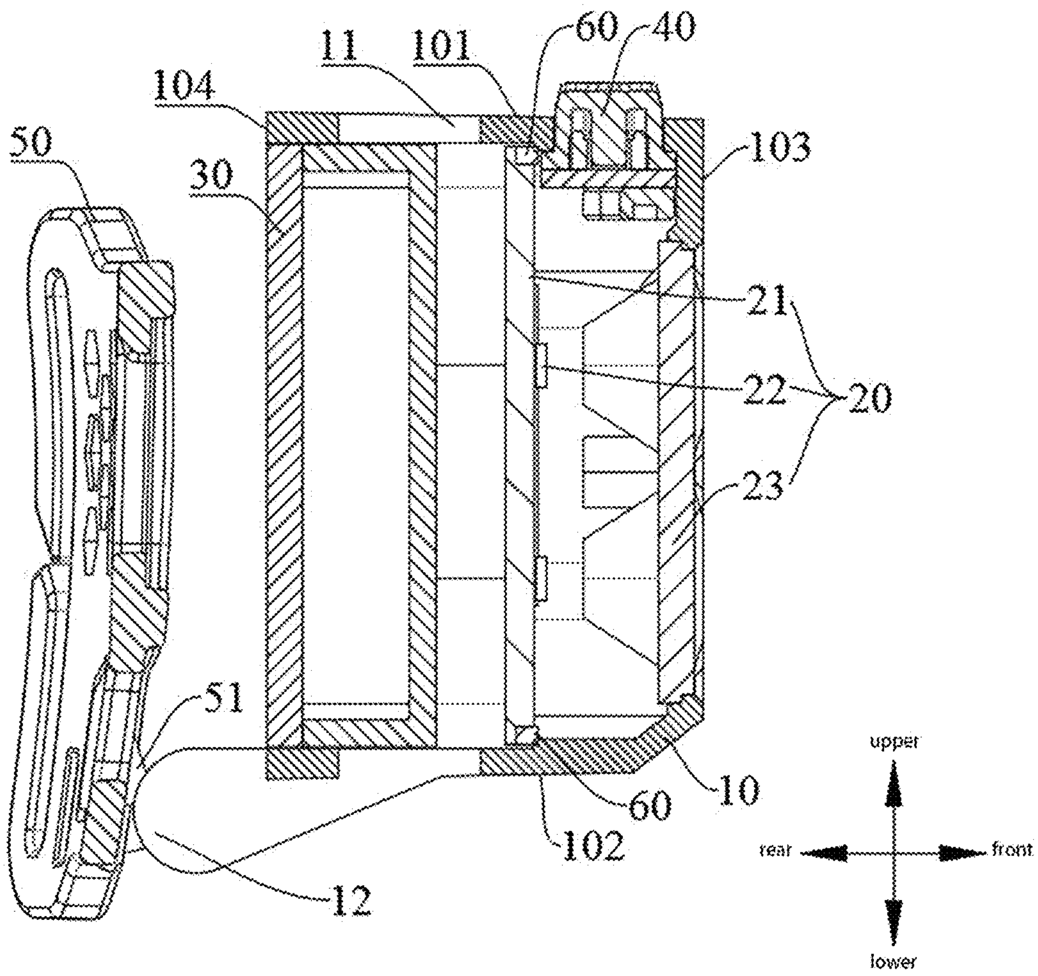
FIG. 4 is a cross-sectional view taken along direction A in FIG. 3.

As shown in FIG. 4, the light source module 20 and the power supply module 30 are positioned on two sides of the heat dissipation channel 11 respectively. The light source module 20 is close to the front side surface 103 of the housing 10, and the power supply module 30 is close to the rear side surface 104 of the housing 10. The heat dissipation channel 11 penetrates through the upper surface 101 and the lower surface 102 of the housing 10. The heat dissipation channel 11 forms a channel open at both ends, facilitating downward or upward air flow. For example, air may flow from an upper end to a lower end of the heat dissipation channel 11, or from the lower end to the upper end of the heat dissipation channel 11.

As shown in FIG. 4, the circuit board 21 has a high thermal conductivity and exhibits excellent heat conduction performance. The circuit board 21 conducts and distributes heat from the light source 22 across the circuit board 21, then dissipates the heat through the heat dissipation channel 11. The circuit board 21 has a flat-plate shape, allowing air in the heat dissipation channel 11 to flow rapidly across a surface of the circuit board 21, resulting in high heat dissipation efficiency. The light source 22 is disposed on the circuit board 21. The circuit board 21 separates the light source 22 from the heat dissipation channel 11, ensuring that air flow in the heat dissipation channel 11 does not affect the light emission of the light source 22. An optical component 23 is configured to converge light emitted by the light source 22, enabling light from the light source 22 to illuminate farther distances. The button 40 is disposed on the upper surface 101 of the housing 10, facilitating operation by user's thumb or index finger. An arc-shaped member 12 is disposed on the housing 10, in an embodiment, the arc-shaped member 12 is disposed on the lower surface 102 of the housing 10. An outer side of the arc-shaped member 12 has an arc-shaped surface. The connecting member 50 is provided with an elastic protrusion 51. The elastic protrusion 51 maintains a deformed state and abuts against the arc-shaped surface of the arc-shaped member 12, generating pressure to the arc-shaped member 12, which resists a rotation between the connecting member 50 and the housing 10 and allows the connecting member 50 and the housing 10 to maintain a certain included angle.

As shown in FIG. 4, the heat-dissipating headlamp further includes a sealing structure 60. The sealing structure 60 is configured to fill and seal the gap between the housing 10 and the circuit board 21. The sealing structure 60 prevents water or moisture in the heat dissipation channel 11 from entering through the gap and contacting the circuit board 21 and the light source 22. The sealing structure 60 may employ a sealing ring or sealing adhesive, such as a silicone waterproof ring.

Figure 5:
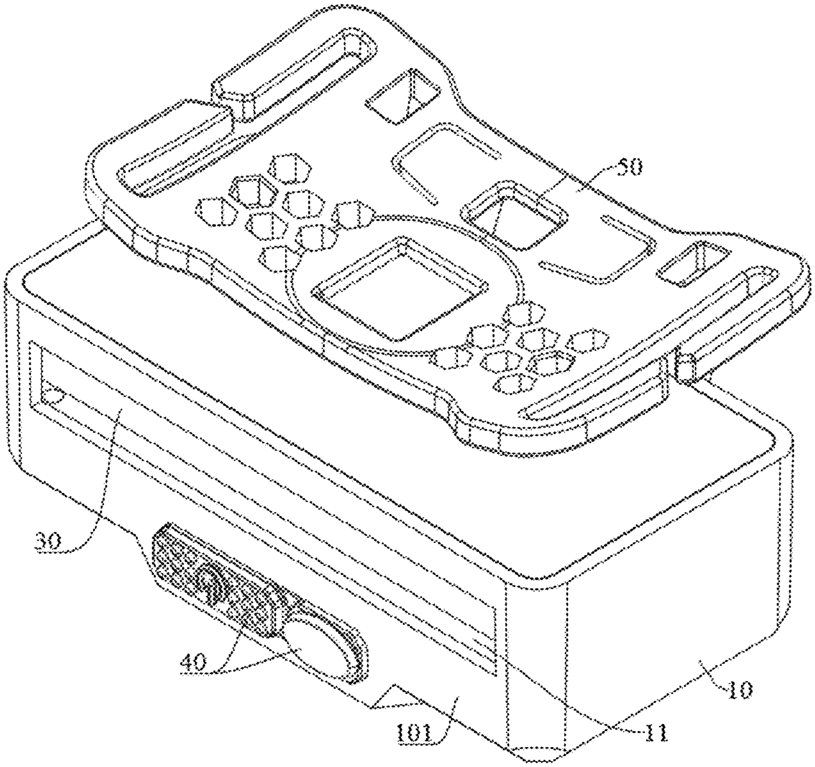
FIG. 5 is a second perspective view of the heat-dissipating headlamp according to an embodiment of the present application.

As shown in FIG. 5, the button 40 is positioned on the upper surface 101 of the housing 10. There may be two buttons 40, and a power button and an adjustment function button is provided. The connecting member 50 has a curved-surface rectangular shape.

Figure 6:
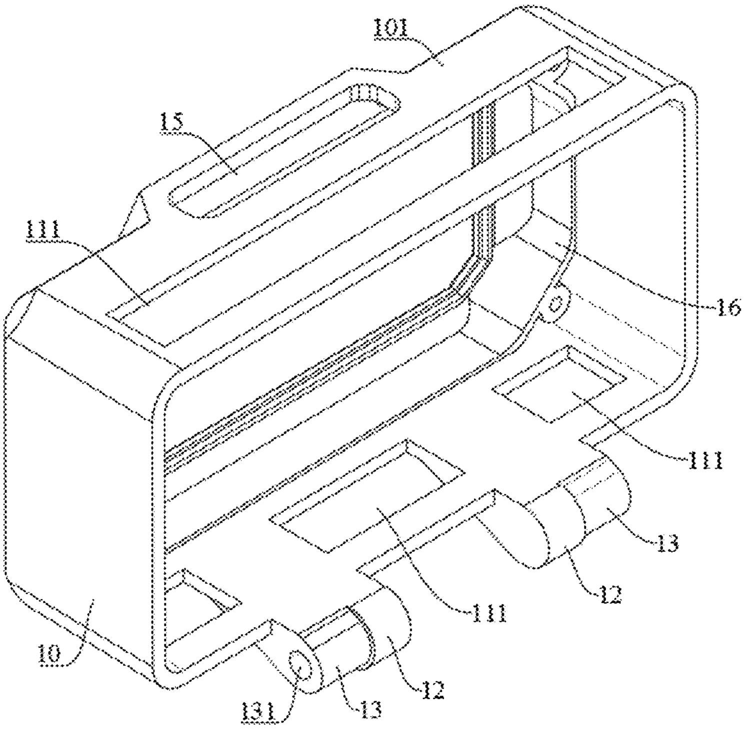
FIG. 6 is a first structural schematic diagram of a housing according to an embodiment of the present application.

As shown in FIG. 6, the rear side surface 104 of the housing 10 forms an opening (refer to in FIG. 4), allowing the light source module 20 and the power supply module 30 to pass through for installation and removal. The left side surface and the right side surface of the housing 10 are enclosed (refer to FIG. 7). Both the upper surface 101 and the lower surface 102 of the housing 10 form through holes 111. The through holes 111 have a relatively large size, exposing the power supply module 30 (refer to FIG. 3 and FIG. 5), which facilitates heat dissipation of the power supply module 30. The upper surface 101 of the housing 10 also forms a second mounting hole 15, allowing the button 40 to pass through. A limiting plate 16 is formed inside the housing 10. The limiting plate 16 surrounds a periphery of the light source 22. The light source 22 is enclosed by the circuit board 21, the limiting plate 16, and the optical component 23, providing protection for the light source 22 (refer to FIG. 4). A mounting base 13 is disposed on the housing 10, in an embodiment, the mounting base 13 is disposed on the lower surface 102 of the housing 10. The mounting base 13 is formed with a shaft hole 131. The connecting member 50 is provided with a rotating shaft 52 (refer to FIG. 12). The rotating shaft 52 is inserted into the shaft hole 131 and is capable of rotating within the shaft hole 131.

Figure 7:
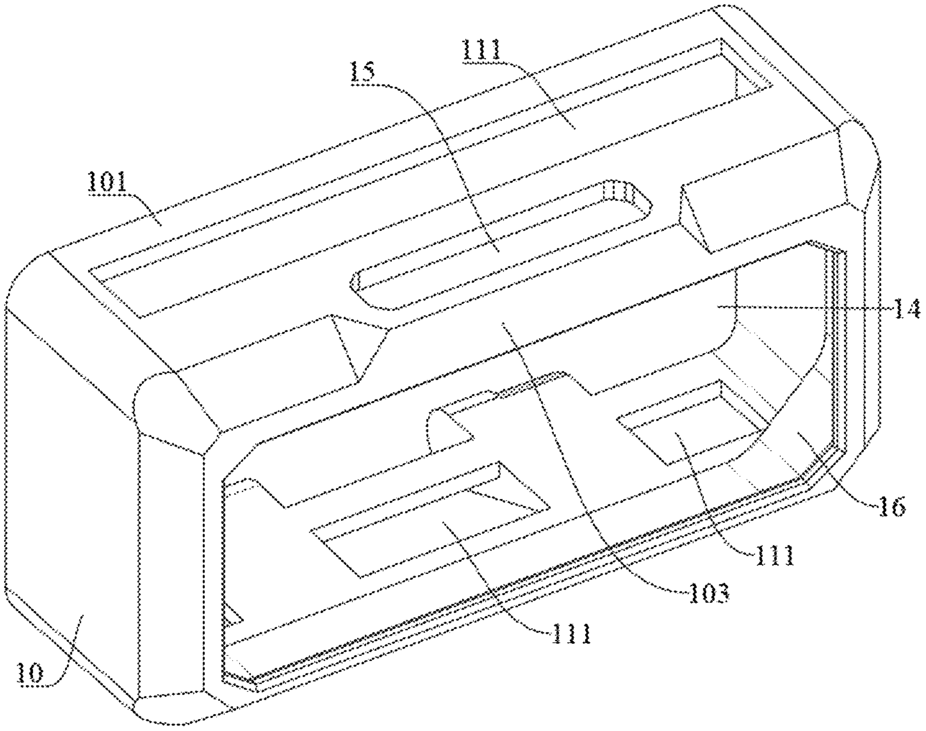
FIG. 7 is a second structural schematic diagram of the housing according to an embodiment of the present application.

As shown in FIG. 7, the front side surface 103 of the housing 10 forms a first mounting hole 14 for mounting the optical component 23 (refer to FIG. 4). The first mounting hole 14 is a stepped hole that limits a position of the optical component 23 and prevents further forward movement of the optical component 23.

Figure 8:
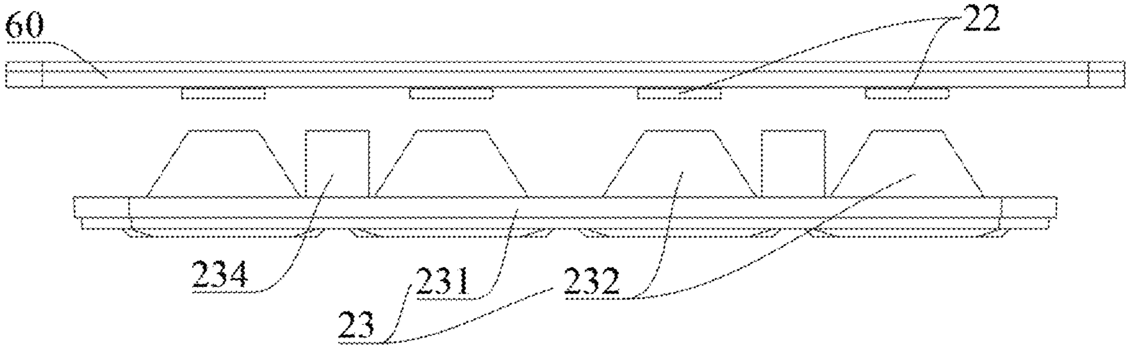
FIG. 8 is a structural schematic diagram of a light source module according to an embodiment of the present application.

As shown in FIG. 8, the optical component 23 is made of light-transmitting material. The optical component 23 is positioned in the light emission direction of the light source 22. The optical component 23 includes a substrate 231. The substrate 231 is located within the first mounting hole 14 (refer to FIG. 4 and FIG. 7). The optical component 23 includes a conical platform 232. The conical platform 232 is a frustum-cone shape. A number of conical platforms 232 corresponds to a number of light sources 22, disposed in a one-to-one configuration. The light emitted by the light source 22 is divergent. The conical platform 232 serves a light-converging function, focusing the light emitted by the light source 22. The light exiting the conical platform 232 is more concentrated, enabling long-distance propagation. The conical platform 232 and the substrate 231 may be integrally formed. The optical component 23 further includes support pillars 234. The support pillars 234 are disposed on the substrate 231. When the substrate 231 becomes deformed, the support pillars 234 can provide support against the circuit board 21, reducing damage to the circuit board 21 and the light source 22. The conical platform 232 may alternatively be replaced with a convex lens or a Fresnel lens.

Figure 9:
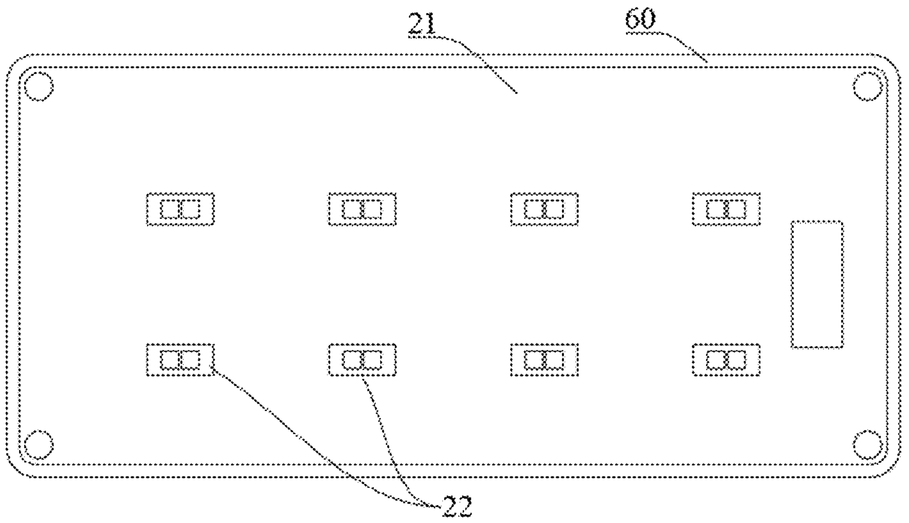
FIG. 9 is a structural schematic diagram of a circuit board and a light source according to an embodiment of the present application.

As shown in FIG. 9, a plurality of the light sources 22 are provided, the plurality of the light sources 22 are disposed in an array pattern on the circuit board 21.

Figure 10:
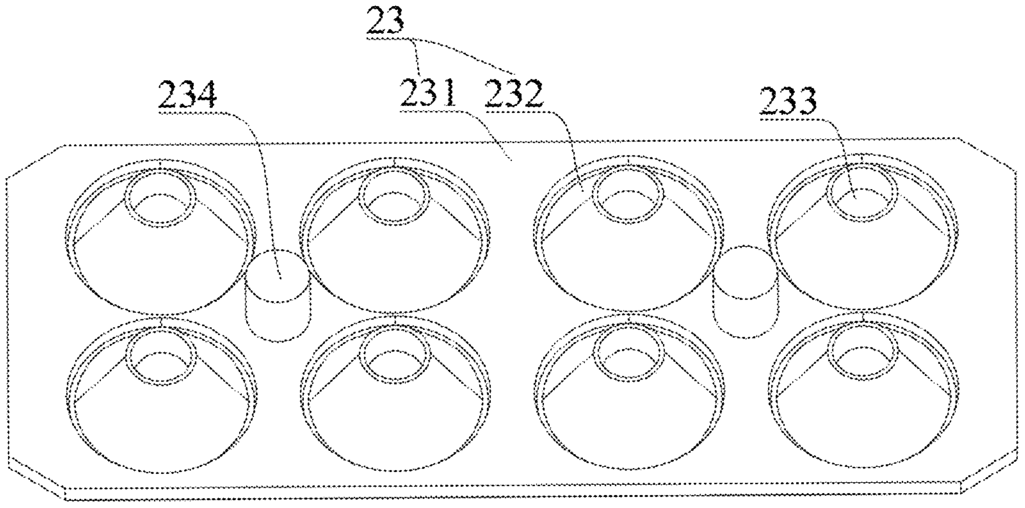
FIG. 10 is a structural schematic diagram of an optical component according to an embodiment of the present application.

As shown in FIG. 10, a plurality of the conical platforms 232 are disposed in an array pattern on the substrate 231. A counterbore groove 233 is formed at a top of each conical platform 232. The top of the conical platform 232 forms an annular wedge-shaped structure, which helps retain light within the conical platform 232 and allows light to exit from a bottom of the conical platform 232. The conical platform 232 has a light-converging end oriented toward the light source 22. The light-converging end may be a protruding curved-surface structure, such as a curved surface of the convex lens or a curved surface of the Fresnel lens. The light-converging end may be disposed at a bottom of the counterbore groove 233.

Figure 11:
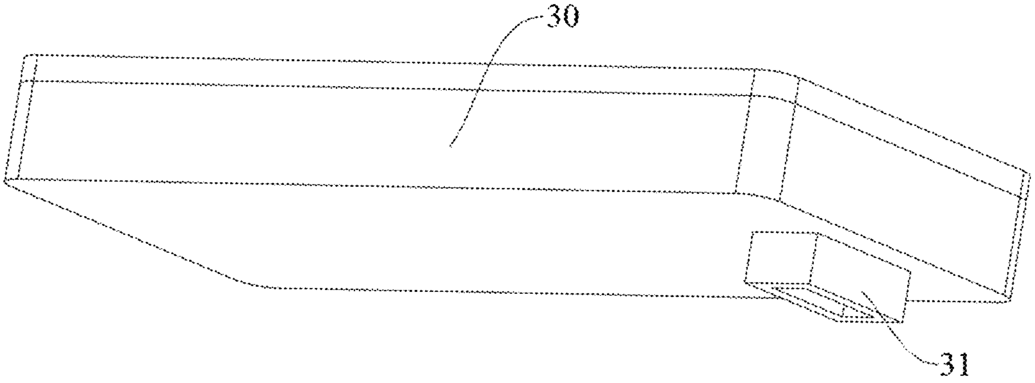
FIG. 11 is a structural schematic diagram of a power supply module according to an embodiment of the present application.

As shown in FIG. 11, the power supply module 30 is provided with a second connector 31. A first connector is disposed on the circuit board 21. The first connector and the second connector 31 are interconnected to achieve electrical connection between the power supply module 30 and the light source module 20.

Figure 12:
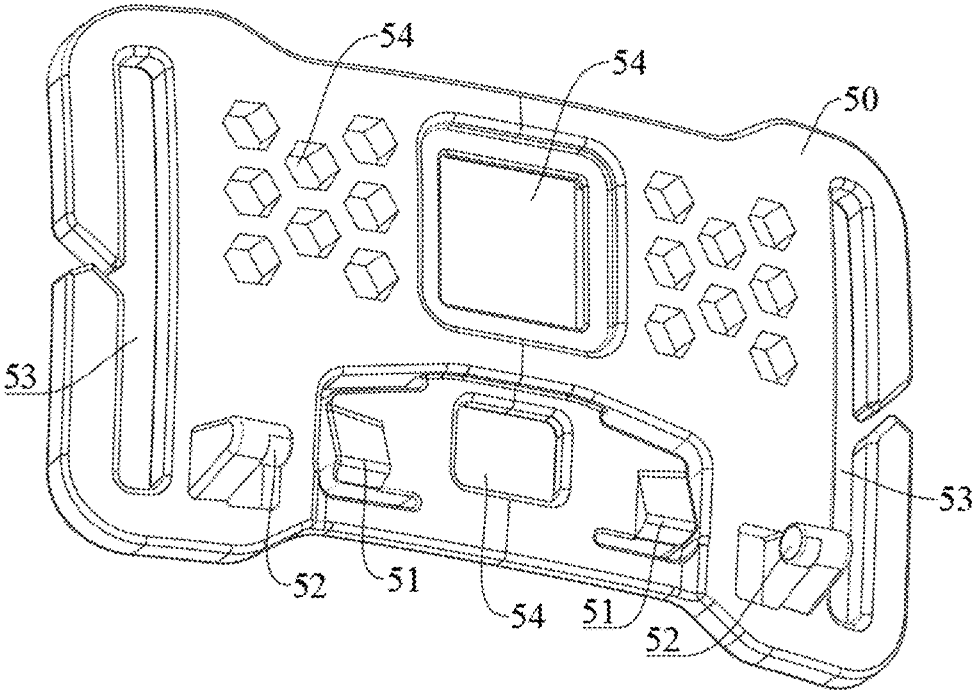
FIG. 12 is a structural schematic diagram of a connecting member according to an embodiment of the present application.

As shown in FIG. 12, the connecting member 50 includes two rotating shafts 52. The housing 10 is provided with two mounting bases 13 (refer to FIG. 6). Each mounting base 13 is assembled with a corresponding rotating shaft 52. Two elastic protrusions 51 and two arc-shaped members 12 are provided (refer to FIG. 6). Each elastic protrusion 51 abuts against an outer side of the corresponding arc-shaped member 12. A central axis of each arc-shaped member 12 is collinear with a central axis of the corresponding rotating shaft 52. When the rotating shaft 52 rotates within the shaft hole 131, pressure applied by the elastic protrusion 51 to the arc-shaped member 12 remains substantially consistent. Both elastic protrusions 51 are positioned between the two rotating shafts 52. The connecting member 50 is further provided with connection portions 53, and two connection portions 53 are provided, the two connection portions 53 are located at a left end and a right end of the connecting member 50 respectively. Each connection portion 53 may be an elongated hole with a slot, allowing a loop structure of a headband to be inserted through the slot and sleeved at the elongated hole, thereby connecting the headband to the connection portion 53. The connecting member 50 includes hole structures 54. The hole structures 54 may be rectangular holes, hexagonal holes, or similar shapes, facilitating heat dissipation for the forehead and enhancing structural strength of the connecting member 50.

It should be understood that the application of the present application is not limited to the examples described above. Those of ordinary skill in the art may make modifications or variations based on the above descriptions. All such modifications and variations shall fall within the scope of protection defined by the appended claims of the present application.

What is claimed is:

1. A heat-dissipating headlamp to be worn on a user's head through a headband, comprising:

a housing, wherein a heat dissipation channel is formed;

a light source module and a power supply module, both located within the housing, wherein the light source module comprises a circuit board; and a connecting member rotatably connected to the housing, wherein the connecting member is configured in a curved-surface shape adapted to a forehead, wherein the circuit board and the power supply module are electrically connected; and the circuit board and the power supply module are respectively located at two sides of the heat dissipation channel, and one side of the circuit board close to the heat dissipation channel is partially or entirely exposed within the heat dissipation channel.

2. The heat-dissipating headlamp according to claim 1, further comprising:

a sealing structure located between the circuit board and an inner wall of the housing.

3. The heat-dissipating headlamp according to claim 1, wherein the one side of the circuit board close to the heat dissipation channel is covered with a thermally conductive insulating layer; or the one side of the circuit board close to the heat dissipation channel is laminated with a metal layer and an insulating layer.

4. The heat-dissipating headlamp according to claim 1, wherein the light source module comprises:

a light source disposed on an other side of the circuit board opposite to the heat dissipation channel.

5. The heat-dissipating headlamp according to claim 4, wherein the light source module further comprises:

an optical component located in a light emission direction of the light source.

6. The heat-dissipating headlamp according to claim 4, wherein a first connector is disposed on the circuit board, and a second connector is disposed on the power supply module; and the first connector and the second connector are connected.

7. The heat-dissipating headlamp according to claim 4, wherein a limiting plate is formed inside the housing, and the limiting plate surrounds the light source.

8. The heat-dissipating headlamp according to claim 1, wherein a button is disposed on an upper surface of the housing, and the button is electrically connected to the light source module; and/or the heat dissipation channel penetrates through the upper surface and a lower surface of the housing.

9. The heat-dissipating headlamp according to claim 1, wherein an arc-shaped member is disposed on the housing, an elastic protrusion is disposed on the connecting member, and the elastic protrusion abuts against the arc-shaped member;

a mounting base is disposed on the housing, and a shaft hole is formed at the mounting base;

a rotating shaft is disposed on the connecting member, and the rotating shaft is inserted into the shaft hole;

a central axis of the arc-shaped member is coaxial with a central axis of the rotating shaft; and connection portions are respectively disposed on a left end and a right end of the connecting member, and the connection portions are configured to connect a headband.

* * * * *